United States Patent
Chen

(10) Patent No.: US 9,142,976 B2
(45) Date of Patent: Sep. 22, 2015

(54) WIRELESS POWER TRANSMISSION DEVICE

(71) Applicant: Primax Electronics Ltd., Neihu, Taipei (TW)

(72) Inventor: Chih Hung Chen, Taipei (TW)

(73) Assignee: PRIMAX ELECTRONICS LTD., Neihu (TW)

( * ) Notice: Subject to any disclaimer, the term of this patent is extended or adjusted under 35 U.S.C. 154(b) by 511 days.

(21) Appl. No.: 13/707,420

(22) Filed: Dec. 6, 2012

(65) Prior Publication Data

US 2014/0111148 A1  Apr. 24, 2014

(30) Foreign Application Priority Data

Oct. 19, 2012 (TW) ............... 101138690 A

(51) Int. Cl.
- *H02J 7/00* (2006.01)
- *B60R 11/02* (2006.01)
- *H02J 7/02* (2006.01)
- *H04B 5/00* (2006.01)
- *H02J 17/00* (2006.01)
- *B60R 11/00* (2006.01)

(52) U.S. Cl.
CPC . *H02J 7/00* (2013.01); *B60R 11/02* (2013.01); *H02J 7/025* (2013.01); *H02J 17/00* (2013.01); *H04B 5/0037* (2013.01); *H04B 5/0075* (2013.01); *B60R 2011/0071* (2013.01); *B60R 2011/0075* (2013.01)

(58) Field of Classification Search
CPC .......................................................... H02J 7/00
USPC ......................................... 320/107, 108, 115
See application file for complete search history.

(56) References Cited

U.S. PATENT DOCUMENTS

| | | | |
|---|---|---|---|
| 8,099,138 B2* | 1/2012 | Piekarz | 455/569.2 |
| 8,164,303 B2* | 4/2012 | Lin | 320/114 |
| 8,248,028 B2* | 8/2012 | Toya et al. | 320/108 |
| 8,310,200 B2* | 11/2012 | Matouka et al. | 320/108 |
| 8,410,751 B2* | 4/2013 | Terao et al. | 320/108 |
| 8,525,471 B2* | 9/2013 | Thorsell et al. | 320/107 |
| 8,624,547 B2* | 1/2014 | Thorsell et al. | 320/108 |
| 8,905,367 B2* | 12/2014 | Bury | 248/316.4 |
| 8,981,714 B2* | 3/2015 | Miller et al. | 320/108 |
| 2008/0001572 A9* | 1/2008 | Baarman et al. | 320/108 |
| 2009/0153098 A1* | 6/2009 | Toya et al. | 320/108 |
| 2011/0062916 A1* | 3/2011 | Farahani | 320/108 |
| 2013/0206945 A1* | 8/2013 | Chen | 248/316.4 |
| 2013/0244735 A1* | 9/2013 | Bury | 455/573 |
| 2014/0293538 A1* | 10/2014 | Han et al. | 361/690 |

* cited by examiner

*Primary Examiner* — Richard V Muralidar
(74) *Attorney, Agent, or Firm* — Kirton McConkie; Evan R. Witt

(57) ABSTRACT

A wireless power transmission device includes a main body and a position-limiting plate. The main body includes a triggering button. The triggering button is located at a first side of the main body. The position-limiting plate is located at a second side of the main body and movable relative to the main body. When an electronic device is placed on the main body and contacted with the triggering button, the triggering button issues an enabling signal to the position-limiting plate. In response to the enabling signal, the position-limiting plate is moved toward the main body in order to fix the electronic device on the main body. In a case that an electric current provided to the triggering button is interrupted, the triggering button stops issuing the enabling signal. Consequently, the position-limiting plate is moved away from the main body and separated from the electronic device.

12 Claims, 4 Drawing Sheets

WIRELESS POWER TRANSMISSION DEVICE

FIELD OF THE INVENTION

The present invention relates to a power transmission device, and more particularly to a wireless power transmission device utilizing a wireless charging technology.

BACKGROUND OF THE INVENTION

Conventionally, most electronic devices should be connected with power sources to acquire electric power in order to be normally operated. Generally, all of these electronic devices are plugged into corresponding power sources (for example power sockets) to acquire the electric power. With increasing development of science and technology, a variety of electronic devices are developed toward small size, light weightiness and easy portability in order to comply with the users' requirements. Although the electronic device can be easily carried, the electronic device is unable to be connected with the power source to acquire the electric power at any time. Generally, a built-in chargeable battery is usually installed in the electronic device for providing sufficient electric power to the electronic device.

For example, in a case that the electricity quantity of the chargeable battery of the electronic device is insufficient, the chargeable battery of the electronic device may be charged by a charging device. In this context, the charging device is also referred as a power transmission device. Generally, the conventional power transmission device has a connecting wire. After the connecting wire is plugged into the electronic device and the conventional power transmission device is connected with the power source, the electric power may be transmitted from the power transmission device to the electronic device through the connecting wire. However, the applications of the power transmission device are usually restricted by the connecting wire. For example, if the conventional power transmission device has been used to charge the electronic device for a long term, the connector of the connecting wire of the power transmission device is readily damaged because the connector of the connecting wire is frequently plugged into and removed from the electronic device. Under this circumstance, the charging efficiency of the connecting wire of the power transmission device is deteriorated. If the connector is seriously damaged, the charging task fails to be done through the connecting wire. Moreover, since the power transmission device is used for charging the electronic device by a wired charging technology, the connecting wire or some other wires are exposed. These wires are usually disorder and difficult to be managed. Especially when the task of charging the electronic device is performed within a narrow space of a vehicle by using the conventional power transmission device, the problems of causing the disordered wires become more serious.

For solving the drawbacks from the wired charging technology of using the connecting wire, with increasing development of a wireless charging technology, a wireless power transmission device for wirelessly charging the electronic device has been introduced into a market. FIG. 1 schematically illustrates the relationship between a conventional wireless power transmission device and a conventional portable electronic device. As shown in FIG. 1, the conventional wireless power transmission device 1 comprises a housing 10, a power cable 11, a circuit board (not shown), and a closed transmitter coil 12. In the conventional wireless power transmission device 1, the power cable 11 is exposed outside the housing 10 to be connected with a power source (not shown). For example, the power source is a power socket. The circuit board (not shown) is disposed within the housing 10 and connected with the power cable 11. Consequently, an electric current from the power source may be transmitted to the circuit board through the power cable 11. The closed transmitter coil 12 is disposed on the circuit board. Consequently, after the electric current from the power source is transmitted through the power cable 11 and the circuit board, the electric current may flow through the closed transmitter coil 12 to result in an electromagnetic effect. In response to the magnetic flux generated by the electromagnetic effect, the closed transmitter coil 12 outputs a corresponding electric power.

A conventional electronic device 2 is also shown in FIG. 1. The conventional electronic device 2 comprises an electronic device casing 20, a closed receiver coil 21, and a chargeable battery (not shown). The closed receiver coil 21 of the conventional electronic device 2 is disposed within the electronic device casing 20 for receiving the electric power from the closed transmitter coil 12. The chargeable battery is connected with the closed receiver coil 21 for storing the electric power which is received by the closed receiver coil 21.

When the electronic device casing 20 of the conventional electronic device 2 is contacted with the housing 10 of the conventional wireless power transmission device 1, if the electric power is outputted from the closed transmitter coil 12 and the closed receiver coil 21 is placed at a position near the closed transmitter coil 12 to receive the electric power, the electric power can be transmitted to the chargeable battery. Consequently, the wireless charging task is completed. However, during the process of transmitting the electric power from the conventional wireless power transmission device 1 to the conventional electronic device 2, the closed receiver coil 21 within the conventional electronic device 2 should be purposely placed at a position near the closed transmitter coil 12 of the conventional wireless power transmission device 1. That is, for allowing the closed receiver coil 21 to receive the electric power, the closed transmitter coil 12 should be aligned with the closed receiver coil 21 as precisely as possible.

For solving the problems of the disordered wires, the conventional wireless power transmission device may be applied to a vehicular operating platform. FIG. 2 schematically illustrates a conventional wireless power transmission device installed in a vehicular operating platform. As shown in FIG. 2, the conventional wireless power transmission device 4 comprises a housing (not shown), a power cable (not shown), a circuit board (not shown), and a closed transmitter coil 41. The configurations of the conventional wireless power transmission device 4 are substantially identical to those of the conventional wireless power transmission device 1, and are not redundantly described herein. In addition, the conventional wireless power transmission device 4 is installed in the vehicular operating platform 3. The power cable is electrically connected with a vehicular power source (not shown) such as a vehicular battery.

The vehicular operating platform 3 comprises a supporting surface 31 and an operating button 32. An electronic device 5 (see FIG. 3) may be placed on the supporting surface 31. The configurations of the electronic device 5 are substantially identical to those of the conventional electronic device 3, and are not redundantly described herein. The operating button 32 is electrically connected with the wireless power transmission device 4 for enabling or disabling the wireless power transmission device 4.

FIG. 3 schematically illustrates the use of the conventional electronic device to wirelessly charge the electronic device. For charging the electronic device 5, the electronic device 5 should be firstly placed on the supporting surface 31, and the electronic device 5 should be located near the wireless power transmission device 4. Then, by pressing the operating button 32, the wireless power transmission device 4 is enabled. After the operating button 32 is pressed, an electric current from the vehicular power source flows through the closed transmitter coil 41 of the wireless power transmission device 4 to result in an electromagnetic effect. Due to the electromagnetic effect, the closed transmitter coil 41 outputs a corresponding electric power to the electronic device 5. After the task of wirelessly charging the electronic device 5 is completely, the user may press the operating button 32 again to interrupt the electric current from the vehicular power source, so that the wireless power transmission device 4 is disabled.

From the above discussions, the problems of the disordered wires can be solved when the conventional wireless power transmission device 4 is installed in the vehicular operating platform 3. Moreover, since it is not necessary to insert the connecting wire into the electronic device 5 with the both hands of the user, the use of the conventional wireless power transmission device 4 can assure the safety of driving a vehicle. However, the conventional wireless power transmission device 4 still has some drawbacks. For example, the electronic device 5 is only placed on the supporting surface 31, but not fixed on the supporting surface 31. If the user brakes the vehicle while driving, the electronic device 5 may readily drop down from the supporting surface 31, and thus the wireless charging task is interrupted. Moreover, since the electronic device 5 readily drops down, the possibility of causing damage of the electronic device 5 increased.

Therefore, there is a need of providing a wireless power transmission device with a fixing function.

SUMMARY OF THE INVENTION

The present invention provides a wireless power transmission device with a fixing function.

In accordance with an aspect of the present invention, there is provided a wireless power transmission device for use with a vehicular operating platform to transmit electric power to a closed receiver coil of an electronic device. The wireless power transmission device includes a main body and a position-limiting plate. The main body is disposed on the vehicular operating platform for supporting the electronic device thereon. The main body includes a closed transmitter coil, a contacting surface, a first sidewall, and a triggering button. The closed transmitter coil is disposed within the main body. When the closed transmitter coil is electrically conducted, the closed transmitter coil results in an electromagnetic effect. In response to the electromagnetic effect, the electric power is generated and transmitted to the closed receiver coil. The contacting surface may be contacted with the electronic device. The first sidewall is located at a first side of the contacting surface for supporting the electronic device, so that the electronic device is contacted with the contacting surface. The triggering button is disposed on the first sidewall. When the electronic device is contacted with the contacting surface, the triggering button is triggered to issue an enabling signal. The position-limiting plate is located at a second side of the main body and movable relative to the main body. When the enabling signal is received by the position-limiting plate, the position-limiting plate is moved toward the main body, so that the electronic device is fixed on the contacting surface. When the triggering button stops issuing the enabling signal, the position-limiting plate is moved away from the main body and separated from the electronic device.

In an embodiment, the closed transmitter coil is connected with a vehicular power source, and the vehicular power source provides an electric current. When the electric current flows through the closed transmitter coil, the closed transmitter coil results in the electromagnetic effect.

In an embodiment, the contacting surface is an inclined surface.

In an embodiment, the main body further includes a second sidewall. The second sidewall is located at a third side of the contacting surface and perpendicular to the first sidewall. The electronic device is fixed on the contacting surface by the second sidewall and the first sidewall collaboratively. When the position-limiting plate is moved to a position near the main body in response to the enabling signal, a position-limiting recess defined by the first sidewall, the second sidewall and the position-limiting plate is formed in the contacting surface.

In an embodiment, the second sidewall further includes a notch, wherein a finger of a user is allowed to be introduced into the notch to remove the electronic device from the contacting surface.

In an embodiment, the triggering button is connected with a vehicular power source for providing an electric current to the triggering button. When the triggering button is pressed by the electronic device, the triggering button is electrically conducted to issue the enabling signal. When the electric current from the vehicular power source to the triggering button is interrupted, the triggering button stops issuing the enabling signal.

In an embodiment, the position-limiting plate includes a plate body and a driving module. The plate body is located at the second side of the main body and movable relative to the main body. The driving module is connected with the plate body and electrically connected with the triggering button. When the driving module is enabled in response to the enabling signal, the plate body is moved relative to the main body by the driving module.

In an embodiment, the plate body further includes a notch, wherein a finger of a user is allowed to be introduced into the notch to remove the electronic device from the contacting surface.

In an embodiment, the driving module includes a driving element, a rotating shaft, a transmission element, and an elastic element. The driving element is electrically connected with the triggering button. The driving element is enabled in response to the enabling signal. The rotating shaft is connected with the driving element. When the driving element is enabled, the rotating shaft is driven to be rotated. The transmission element is disposed on the rotating shaft. As the rotating shaft is rotated, the transmission element is correspondingly moved. The elastic element is arranged between the plate body and the transmission element. As the transmission element is moved, the elastic element is pushed by the transmission element, and the elastic element is compressed by the transmission element and the plate body to accumulate an elastic force. When the triggering button stops issuing the enabling signal, the elastic element is not pushed by the transmission element and the elastic force is released, so that the plate body is moved away from the main body and separated from the electronic device in response to the elastic force.

In an embodiment, the driving element is a stepper motor. In addition, the rotating shaft has an outer thread, which is formed on a surface of the rotating shaft. When the stepper motor is enabled and the rotating shaft is rotated, the transmission element is correspondingly moved in response to rotation of the outer thread of the rotating shaft.

In an embodiment, the electronic device further includes an electronic device casing and a chargeable battery. The electronic device casing is used for covering the closed receiver coil. When the electronic device casing is located near the main body or contacted with the main body, the electric power from the closed transmitter coil is received by the closed receiver coil within the electronic device casing. The chargeable battery is disposed within the electronic device casing and connected with the closed receiver coil. The electric power received by the closed receiver coil is stored in the chargeable battery.

In an embodiment, the electronic device further includes an electronic device casing, a protective cover, and a chargeable battery. The protective cover is used for covering the electronic device casing and protecting the electronic device casing. The closed receiver coil is disposed within the protective cover. When the protective cover is located near the main body or contacted with the main body, the electric power from the closed transmitter coil is received by the closed receiver coil within the protective cover. The chargeable battery is disposed within the electronic device casing and connected with the closed receiver coil through the protective cover. The electric power received by the closed receiver coil is stored in the chargeable battery.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
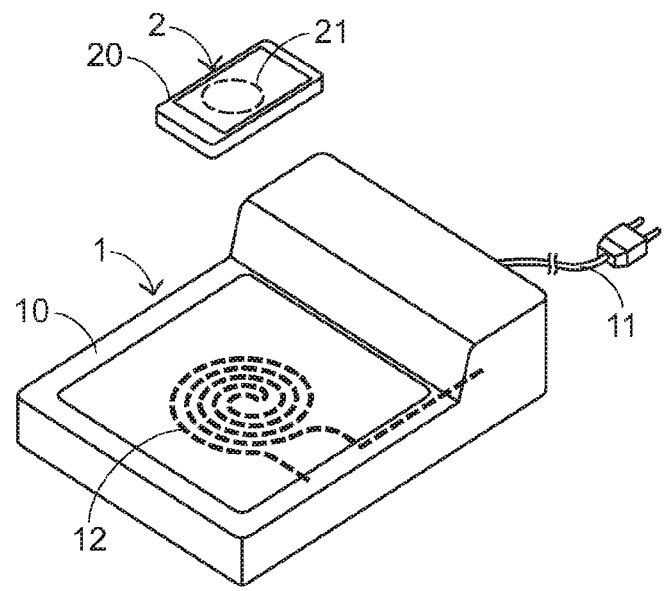
FIG. 1 schematically illustrates the relationship between a conventional wireless power transmission device and a conventional portable electronic device.
Figure 2:
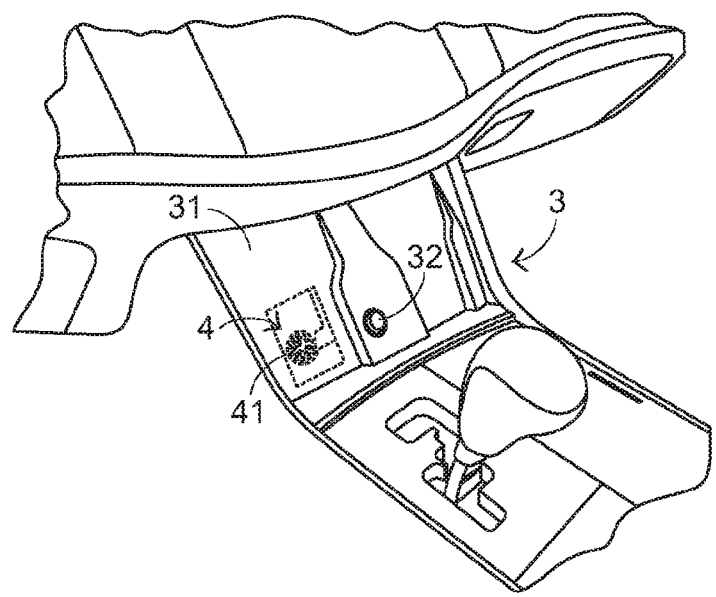
FIG. 2 schematically illustrates a conventional wireless power transmission device installed in a vehicular operating platform.
Figure 3:
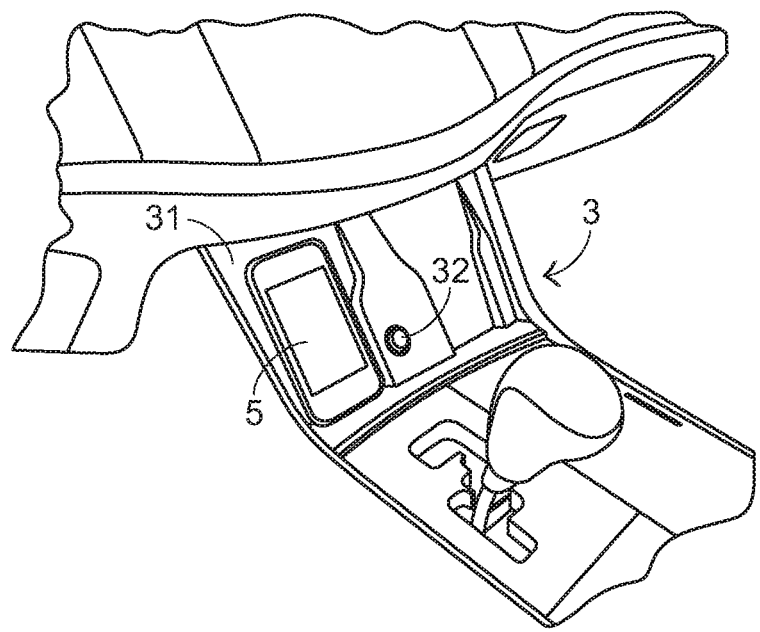
FIG. 3 schematically illustrates the use of the conventional electronic device to wirelessly charge the electronic device.
Figure 4:
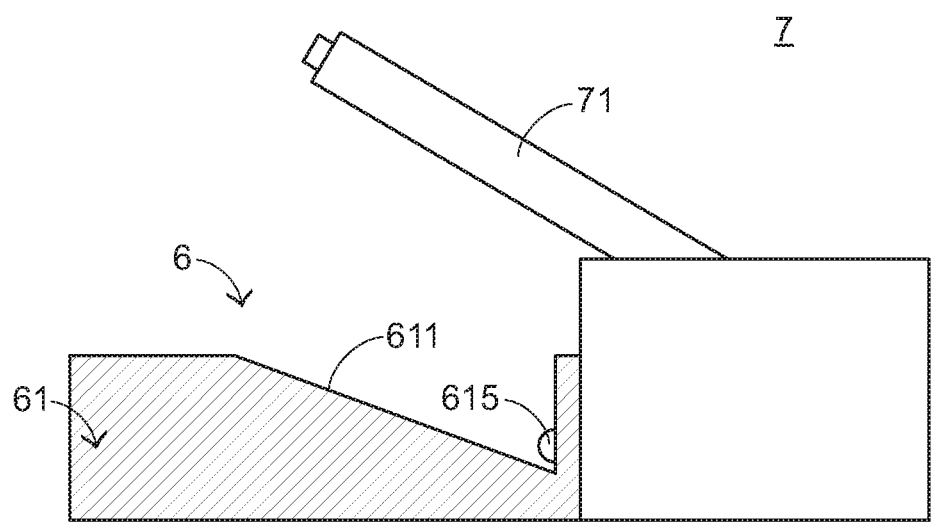
FIG. 4 is a schematic side view illustrating the relationship between a wireless power transmission device and a vehicular operating platform according to an embodiment of the present invention.
Figure 5:
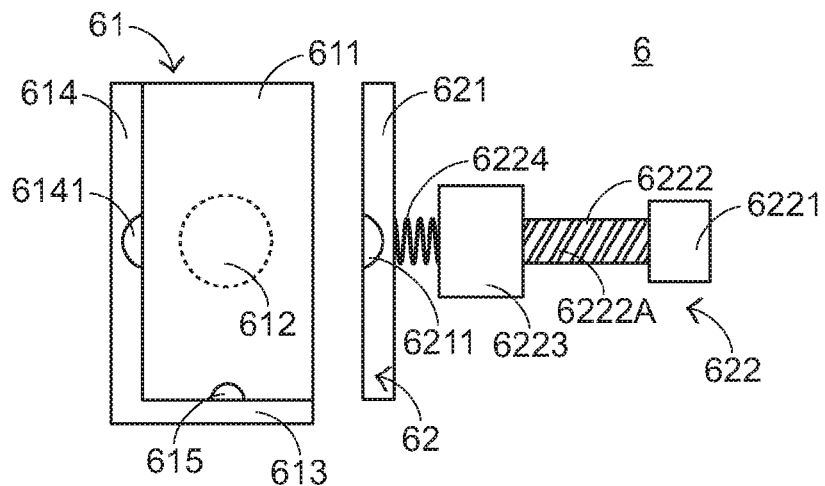
FIG. 5 is a schematic partial top view illustrating the wireless power transmission device according to the embodiment of the present invention.

For solving the drawbacks encountered from the prior art, the present invention provides a wireless power transmission device with a fixing function. Please refer to FIGS. 4 and 5. FIG. 4 is a schematic side view illustrating the relationship between a wireless power transmission device and a vehicular operating platform according to an embodiment of the present invention. FIG. 5 is a schematic partial top view illustrating the wireless power transmission device according to the embodiment of the present invention. The wireless power transmission device 6 is applied to a vehicular operating platform 7. The wireless power transmission device 6 comprises a main body 61 and a position-limiting plate 62. The main body 61 is disposed on the vehicular operating platform 7, and disposed under a hand brake 71 of the vehicular operating platform 7. An electronic device 8 (see FIG. 7) may be placed on the main body 61. The position-limiting plate 62 is located at a second side of the main body 61 and movable relative to the main body 61.

Please refer to FIGS. 4 and 5 again. The main body 61 comprises a contacting surface 611, a closed transmitter coil 612, a first sidewall 613, a second sidewall 614, and a triggering button 615. The electronic device 8 is placed on the contacting surface 611 and contacted with the contacting surface 611. In addition, as shown in FIG. 4, the contacting surface 611 is an inclined surface. The closed transmitter coil 612 is disposed within the main body 61, and connected with a vehicular power source (not shown). In a case that an electric current from the vehicular power source flows through the closed transmitter coil 612, the closed transmitter coil 612 is electrically conducted to result in an electromagnetic effect. Due to the electromagnetic effect, the closed transmitter coil 612 outputs a corresponding electric power to the electronic device 8. In this embodiment, the closed transmitter coil 612 is wound to have a circular shape. Moreover, the closed transmitter coil 612 is parallel with the inclined contacting surface 611 in order to assure the power transmission efficiency of the closed transmitter coil 612. It is preferred that the inclination angle of the contacting surface 611 is about 20 degrees. Of course, the inclination angle of the contacting surface 611 may be adjusted according to the practical requirements.

The first sidewall 613 is located at a first side of the contacting surface 611 for supporting the electronic device 8 in order to facilitate the contact between the electronic device 8 and the contacting surface 611. The second sidewall 614 is located at a third side of the contacting surface 611, and perpendicular to the first sidewall 613. That is, the first sidewall 613 and the second sidewall 614 are collaboratively defined as an L-shaped sidewall (see FIG. 5). The second sidewall 614 and the first sidewall 613 are used for fixing the electronic device 8 on the contacting surface 611 collaboratively. In this embodiment, the contacting surface 611, the first sidewall 613 and the second sidewall 614 are integrally formed with the main body 61. The triggering button 615 is disposed on the first sidewall 613, and electrically connected with the vehicular power source. The vehicular power source provides an electric current to the triggering button 615, so that the triggering button 615 is electrically conducted and normally operated. When the electronic device 8 is contacted with the contacting surface 611, the electronic device 8 is moved toward the first sidewall 613 in response to the inclination angle of the contacting surface 611. At the same time, the electronic device 8 is contacted with the triggering button 615, so that the triggering button 615 is triggered. Under this circumstance, the triggering button 615 issues an enabling signal to the position-limiting plate 62. On the other hand, when the electric current from the vehicular power source to the triggering button 615 is interrupted, the triggering button 615 is no longer electrically conducted. Under this circumstance, the enabling signal is no longer provided to the position-limiting plate 62.

Figure 6:
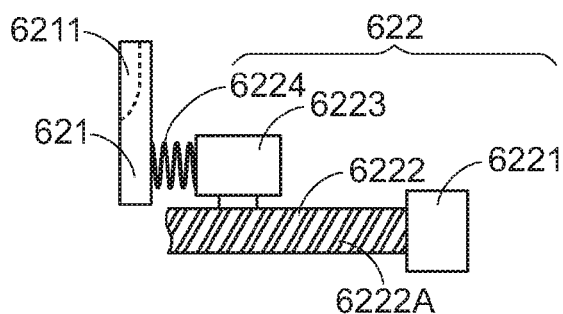
FIG. 6 is a schematic partial side view illustrating the position-limiting plate of the wireless power transmission device according to the embodiment of the present invention.

Hereinafter, the structure of the position-limiting plate will be illustrated with reference to FIGS. 5 and 6. FIG. 6 is a schematic partial side view illustrating the position-limiting plate of the wireless power transmission device according to the embodiment of the present invention. The position-limiting plate 62 comprises a plate body 621 and a driving module 622. The plate body 621 is located at a second side of the main body 61 and movable relative to the main body 61. The driving module 622 is connected with the plate body 621 and electrically connected with the triggering button 615. In response to the enabling signal, the driving module 622 is enabled to move the plate body 621 relative to the main body 61. After the enabling signal is received by the driving module 622 of the position-limiting plate 62, the plate body 621 is moved toward the main body 61 in order to fix the electronic device 8 on the contacting surface 611. In a case that the triggering button 615 stops issuing the enabling signal, the plate body 621 is moved away from the main body 61 and separated from the electronic device 8.

The driving module 622 comprises a driving element 6221, a rotating shaft 6222, a transmission element 6223, and an elastic element 6224. The driving element 6221 is electrically connected with the vehicular power source and the triggering button 615. The driving element 6221 is enabled in response to the enabling signal. The rotating shaft 6222 is connected with the driving element 6221. Moreover, the rotating shaft 6222 is driven to be rotated by the driving element 6221. The rotating shaft 6222 has an outer thread 6222A, which is formed on a surface of the rotating shaft 6222. The transmission element 6223 is disposed on the rotating shaft 6222. In response to rotation of the rotating shaft 6222, the transmission element 6223 is correspondingly moved. After the driving element 6221 is enabled in response to the enabling signal and the rotating shaft 6222 is rotated, the transmission element 6223 is correspondingly moved in response to rotation of the outer thread 6222A of the rotating shaft 6222. The elastic element 6224 is arranged between the plate body 621 and the transmission element 6223. As the transmission element 6223 is moved, the elastic element 6224 is pushed by the transmission element 6223. Consequently, the elastic element 6224 is compressed by the transmission element 6223 and the plate body 621 to accumulate an elastic force. In a case that the triggering button 615 stops issuing the enabling signal, the elastic element 6224 is no longer pushed by the transmission element 6223. Under this circumstance, the elastic force is released. In response to the elastic force, the plate body 621 is moved away from the main body 61 and separated from the electronic device 8. In this embodiment, the driving element 6221 is a stepper motor, and the elastic element 6224 is a compression spring.

Figure 7:
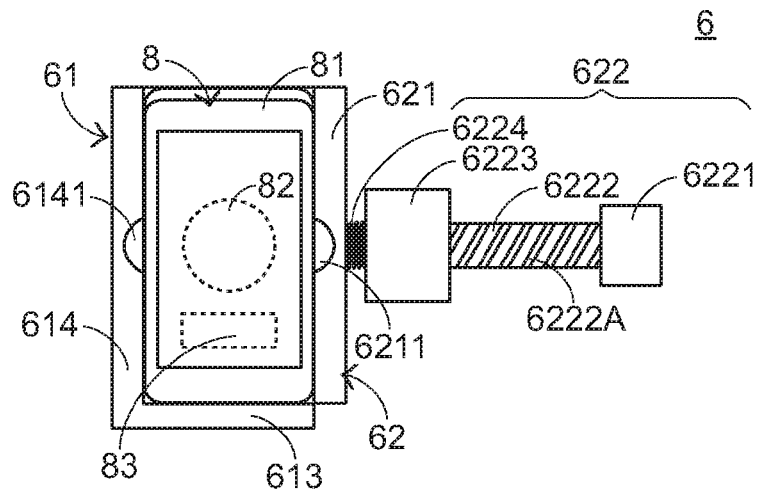
FIG. 7 is a schematic top view illustrating an electronic device fixed on the wireless power transmission device according to the embodiment of the present invention.

Hereinafter, a way of fixing the electronic device 8 on the wireless power transmission device 6 will be illustrated with reference to FIG. 4 and FIG. 7. FIG. 7 is a schematic top view illustrating an electronic device fixed on the wireless power transmission device according to the embodiment of the present invention. In FIG. 7, the electronic device 8 is shown. The electronic device 8 comprises an electronic device casing 81, a closed receiver coil 82, and a chargeable battery 83. The closed receiver coil 82 is covered by the electronic device casing 81. In addition, the closed receiver coil 82 is used for receiving the electric power from the closed transmitter coil 612. The chargeable battery 83 is disposed within the electronic device casing 81 and connected with the closed receiver coil 82. The electric power from the closed transmitter coil 612 may be stored in the chargeable battery 83. When the electronic device casing 81 is located near the main body 61 or contacted with the main body 61, the electric power from the closed transmitter coil 612 is received by the closed receiver coil 82 within the electronic device casing 81.

For charging the electronic device 8, the electronic device 8 is firstly placed on the contacting surface 611 of the main body 61. Meanwhile, in response to the inclined contacting surface 611, the electronic device 8 is moved toward the first sidewall 613 and contacted with the triggering button 615 to trigger the triggering button 615. Consequently, the triggering button 615 issues the enabling signal to the driving element 6221 of the position-limiting plate 62. In this embodiment, the electronic device 8 is a mobile phone. Since the closed transmitter coil 612 is wound as the circular shape, the closed receiver coil 82 is correspondingly wound as the circular shape.

After the enabling signal is received by the driving element 6221, the driving element 6221 is enabled to drive rotation of the rotating shaft 6222. As the rotating shaft 6222 is rotated, the outer thread 6222A of the rotating shaft 6222 is rotated and the transmission element 6223 is correspondingly moved. Consequently, the transmission element 6223 is moved toward the main body 61 and contacted with the elastic element 6224. Under this circumstance, the elastic element 6224 is compressed by the transmission element 6223 and the plate body 621 to accumulate the elastic force. Moreover, since the plate body 621 is pushed by the transmission element 6223, the plate body 621 is moved toward the main body 61. When the plate body 621 is moved to a position near the main body 61 in response to the enabling signal, a position-limiting recess defined by the first sidewall 613, the second sidewall 614 and the plate body 621 of the position-limiting plate 62 is formed in the contacting surface 611. Moreover, at the same time, the electronic device 8 is fixed on the contacting surface 611 or fixed within the position-limiting recess. Under this circumstance, the first sidewall 613, the second sidewall 614 and the plate body 621 are contacted with the electronic device casing 81 of the electronic device 8.

After the electronic device 8 is fixed, the electronic device 8 is contacted with the contacting surface 611. In addition, the electric power from the closed transmitter coil 612 is received by the closed receiver coil 82 within the electronic device casing 81 of the electronic device 8. The electric power is then transmitted to the chargeable battery 83 within the electronic device casing 81 in order to charge the chargeable battery 83.

Please refer to FIG. 4 and FIG. 7 again. The second sidewall 614 has a first notch 6141, and the plate body 621 has a second notch 6211. Two fingers of a user may be respectively introduced into the first notch 6141 and the second notch 6211 in order to facilitate removing the electronic device 8 from the contacting surface 611 or the position-limiting recess. It is preferred that the profiles of the first notch 6141 and the second notch 6211 match the profiles of the user's fingers.

Figure 8:
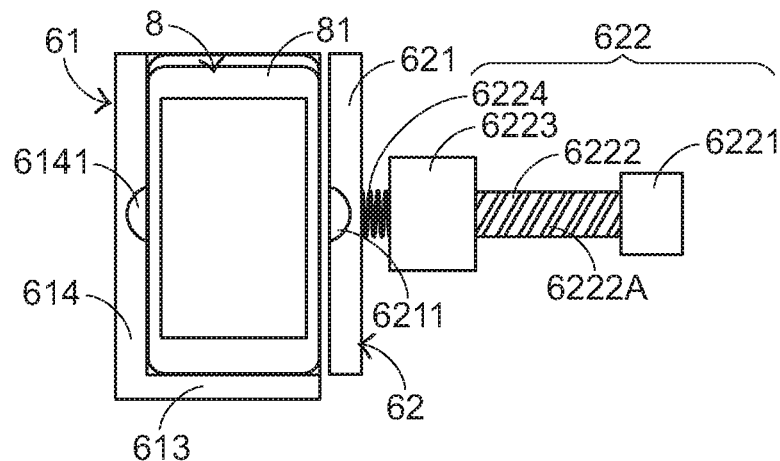
FIG. 8 is a schematic top view illustrating the position-limiting plate of the wireless power transmission device according to the embodiment of the present invention, in which the electric current from the vehicular power source is interrupted.
Figure 9:
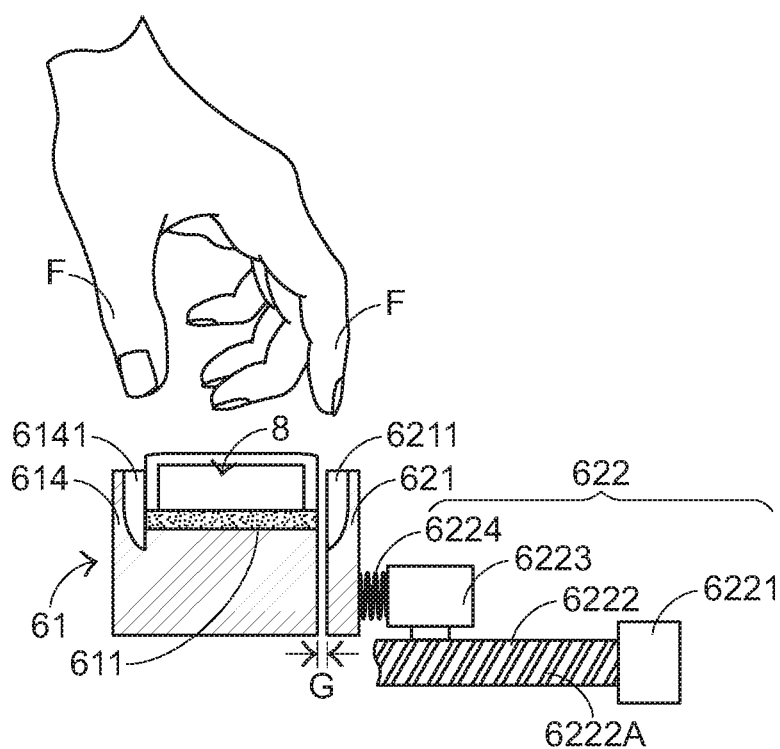
FIG. 9 is a schematic side view illustrating the position-limiting plate of the wireless power transmission device according to the embodiment of the present invention, in which the electric current from the vehicular power source is interrupted.

Please refer to FIGS. 8 and 9. FIG. 8 is a schematic top view illustrating the position-limiting plate of the wireless power transmission device according to the embodiment of the present invention, in which the electric current from the vehicular power source is interrupted. FIG. 9 is a schematic side view illustrating the position-limiting plate of the wireless power transmission device according to the embodiment of the present invention, in which the electric current from the vehicular power source is interrupted. After the electronic device 8 is fixed on the contacting surface 611, the electric power from the closed transmitter coil 612 is received by the electronic device 8. In a case that the vehicular power source has a breakdown or is turned off, the triggering button 615 stops issuing the enabling signal because the electric current from the vehicular power source is interrupted. Under this circumstance, since the enabling signal fails to be received by the driving element 6221, the driving element 6221 is disabled and the rotation of the rotating shaft 6222 is stopped. In addition, since the driving force exerted on the transmission element 6223 is lost, the elastic element 6224 is no longer pushed by the transmission element 6223. Meanwhile, the compressed state of the elastic element 6224 is relieved and the accumulated elastic force is released. In response to the elastic force, the plate body 621 and the transmission element 6223 are slightly moved away from the main body 61, and the plate body 621 is separated from the electronic device casing 81 of the electronic device 8. As shown in FIG. 9, a gap G is formed between the plate body 621 and the electronic device casing 81.

After the gap G is formed, two fingers F of the user may be introduced into the first notch 6141 of the second sidewall 614 and the second notch 6211 of the plate body 621, respectively. Consequently, the electronic device 8 may be removed from the contacting surface 611 easily. That is, after the electric current from the vehicular power source is interrupted, the operations of the above components may relieve the fixing function of the wireless power transmission device 6. Under this circumstance, the electronic device 8 may be removed from the contacting surface 611.

In this embodiment, the electronic device 8 comprises the electronic device casing 81, the closed receiver coil 82, and the chargeable battery 83. The closed receiver coil 82 is covered by the electronic device casing 81. It is noted that the configurations of the electronic device may be varied according to the practical requirements. For example, in another embodiment, the electronic device comprises an electronic device casing, a protective cover, and a chargeable battery. The protective cover is used for covering the electronic device casing, thereby protecting the electronic device casing. The protective cover has a closed receiver coil. That is, the closed receiver coil is disposed within the protective cover, but is not disposed within the electronic device casing. When the electric power from the closed transmitter coil is received by the closed receiver coil, the electric power is transmitted to the chargeable battery within the electronic device casing through the protective cover, so that the task of wirelessly charging the electronic device may be performed.

From the above descriptions, the present invention provides a wireless power transmission device. The wireless power transmission device is installed in an available space of a vehicular operating platform. After the electronic device is placed on a contacting surface of the wireless power transmission device, a position-limiting plate of the wireless power transmission device is driven to be moved. Consequently, the electronic device is fixed on the contacting surface, and the task of wirelessly charging the electronic device may be performed. In a case that the electric current provided to the wireless power transmission device is interrupted, the position-limiting plate is moved in response to an elastic force of an elastic element. Consequently, the electronic device is no longer fixed on the wireless power transmission device. Meanwhile, the electronic device can be removed from the contacting surface of the wireless power transmission device by the user. In comparison with the conventional wireless power transmission device, the wireless power transmission device of the present invention provides a fixing function. Due to the fixing function of the wireless power transmission device, the possibility of dropping down the electronic device is minimized. Consequently, the possibility of causing damage of the electronic device is minimized, and the wireless charging efficiency of the wireless power transmission device of the present invention is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless power transmission device for use with a vehicular operating platform to transmit electric power to a closed receiver coil of an electronic device, said wireless power transmission device comprising:
    a main body disposed on said vehicular operating platform for supporting said electronic device thereon, wherein said main body comprises:
       a closed transmitter coil disposed within said main body, wherein when said closed transmitter coil is electrically conducted, said closed transmitter coil results in an electromagnetic effect, wherein in response to said electromagnetic effect, said electric power is generated and transmitted to said closed receiver coil;
       a contacting surface to be contacted with said electronic device;
       a first sidewall located at a first side of said contacting surface for supporting said electronic device, so that said electronic device is contacted with said contacting surface; and
       a triggering button disposed on said first sidewall, wherein when said electronic device is contacted with said contacting surface, said triggering button is triggered to issue an enabling signal; and
    a position-limiting plate located at a second side of said main body and movable relative to said main body, wherein when said enabling signal is received by said position-limiting plate, said position-limiting plate is moved toward said main body, so that said electronic device is fixed on said contacting surface, wherein when said triggering button stops issuing said enabling signal, said position-limiting plate is moved away from said main body and separated from said electronic device.

2. The wireless power transmission device according to claim 1, wherein said closed transmitter coil is connected with a vehicular power source, and said vehicular power source provides an electric current, wherein when said electric current flows through said closed transmitter coil, said closed transmitter coil results in said electromagnetic effect.

3. The wireless power transmission device according to claim 1, wherein said contacting surface is an inclined surface.

4. The wireless power transmission device according to claim 1, wherein said main body further comprises a second sidewall, wherein said second sidewall is located at a third side of said contacting surface and perpendicular to said first sidewall, wherein said electronic device is fixed on said contacting surface by said second sidewall and said first sidewall collaboratively, wherein when said position-limiting plate is moved to a position near said main body in response to said enabling signal, a position-limiting recess defined by said first sidewall, said second sidewall and said position-limiting plate is formed in said contacting surface.

5. The wireless power transmission device according to claim 4, wherein said second sidewall further comprises a notch, wherein a finger of a user is allowed to be introduced into said notch to remove said electronic device from said contacting surface.

6. The wireless power transmission device according to claim 1, wherein said triggering button is connected with a vehicular power source for providing an electric current to said triggering button, wherein when said triggering button is pressed by said electronic device, said triggering button is electrically conducted to issue said enabling signal, wherein when said electric current from said vehicular power source to said triggering button is interrupted, said triggering button stops issuing said enabling signal.

7. The wireless power transmission device according to claim 1, wherein said position-limiting plate comprises:
   a plate body located at said second side of said main body and movable relative to said main body; and
   a driving module connected with said plate body and electrically connected with said triggering button, wherein when said driving module is enabled in response to said enabling signal, said plate body is moved relative to said main body by said driving module.

8. The wireless power transmission device according to claim 7, wherein said plate body further comprises a notch, wherein a finger of a user is allowed to be introduced into said notch to remove said electronic device from said contacting surface.

9. The wireless power transmission device according to claim 7, wherein said driving module comprises:
   a driving element electrically connected with said triggering button, wherein said driving element is enabled in response to said enabling signal;
   a rotating shaft connected with said driving element, wherein when said driving element is enabled, said rotating shaft is driven to be rotated;
   a transmission element disposed on said rotating shaft, wherein as said rotating shaft is rotated, said transmission element is correspondingly moved; and
   an elastic element arranged between said plate body and said transmission element, wherein as said transmission element is moved, said elastic element is pushed by said transmission element, and said elastic element is compressed by said transmission element and said plate body to accumulate an elastic force, wherein when said triggering button stops issuing said enabling signal, said elastic element is not pushed by said transmission element and said elastic force is released, so that said plate body is moved away from said main body and separated from said electronic device in response to said elastic force.

10. The wireless power transmission device according to claim 9, wherein said driving element is a stepper motor, and said rotating shaft has an outer thread, which is formed on a surface of said rotating shaft, wherein when said stepper motor is enabled and said rotating shaft is rotated, said transmission element is correspondingly moved in response to rotation of said outer thread of said rotating shaft.

11. The wireless power transmission device according to claim 1, wherein said electronic device further comprises:
   an electronic device casing for covering said closed receiver coil, wherein when said electronic device casing is located near said main body or contacted with said main body, said electric power from said closed transmitter coil is received by said closed receiver coil within said electronic device casing; and
   a chargeable battery disposed within said electronic device casing and connected with said closed receiver coil, wherein said electric power received by said closed receiver coil is stored in said chargeable battery.

12. The wireless power transmission device according to claim 1, wherein said electronic device further comprises:
   an electronic device casing;
   a protective cover for covering said electronic device casing and protecting said electronic device casing, wherein said closed receiver coil is disposed within said protective cover, wherein when said protective cover is located near said main body or contacted with said main body, said electric power from said closed transmitter coil is received by said closed receiver coil within said protective cover; and
   a chargeable battery disposed within said electronic device casing and connected with said closed receiver coil through said protective cover, wherein said electric power received by said closed receiver coil is stored in said chargeable battery.

* * * * *